United States Patent Office 3,508,758
Patented Apr. 28, 1970

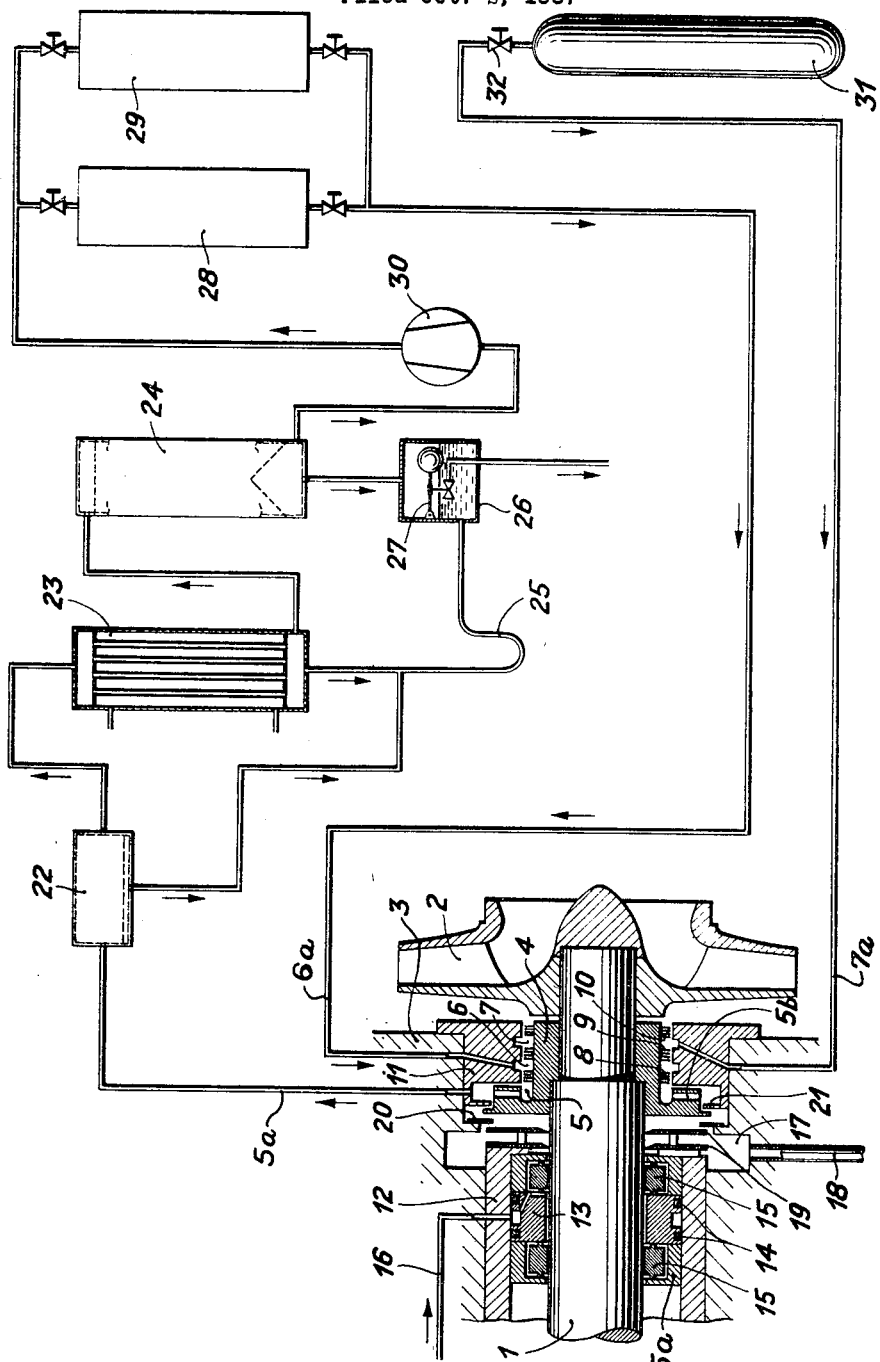

3,508,758
FLUID-TIGHT SEAL FOR ROTATING SHAFT
Rene Strub, Winterthur, Switzerland, assignor to Sulzer Brothers Limited, Winterthur, Switzerland, a Swiss company
Filed Oct. 2, 1967, Ser. No. 672,246
Claims priority, application Switzerland, Oct. 12, 1966, 14,807
Int. Cl. F16j 15/16, 15/40
U.S. Cl. 277—15                                    10 Claims

ABSTRACT OF THE DISCLOSURE

A fluid-tight seal for a rotating shaft is disclosed, the seal comprising liquid sealing means adapted to maintain a body of liquid sealant in fluid tight contact with the surface of the rotating shaft and the adjacent surface of a stationary casing through which the shaft passes, and gas barrier means adapted to prevent liquid sealant from the liquid sealing means from coming into contact with the fluid being contained. The gas barrier means is mounted on the rotating shaft and defines at least three longitudinally spaced annular barrier gas spaces in which a barrier gas may be maintained. Barrier gas is introduced into the centermost of the annular barrier gas spaces and is withdrawn from the annular barrier gas space nearest the liquid sealing means. The barrier gas is then circulated through a closed barrier gas circuit in which entrained liquid sealant is removed from the gas before the gas is returned to the centermost of the annular barrier gas spaces. Blower means are provided for circulating the barrier gas through the barrier gas circuit and the gas barrier means, the blower advantageously comprising an impeller mounted on the rotating shaft in the annular gas barrier space adjacent the liquid sealing means. Make-up barrier gas is advantageously added to the barrier gas circuit at the annular barrier gas space furthest away from the liquid sealing means.

BACKGROUND OF THE INVENTION

Rotating shafts which extend into spaces containing dangerous fluids, such as poisonous or radioactive gases, must be provided with fluid-tight seals which prevent the escape of these dangerous fluids into the surrounding atmosphere. By way of example, nuclear power plants are sometimes cooled with a gaseous coolant such as carbon dioxide which is caused to circulate throughout the nuclear reactor by means of a shaft driven centrifugal blower. Because of the danger of radioactive contamination, leakage of gaseous reactor coolant along the rotating shaft to the outside atmosphere must be avoided at all costs. A liquid seal utilizing a liquid sealant is commonly employed to effect the required fluid-tight seal, and in such case the leakage of liquid sealant from the seal into the gaseous reactor coolant circuit must also be avoided. The same problem also arises in plants other than nuclear reactor plants whenever an expensive or poisonous gas must be circulated by a blower, particularly if the gas has to be compressed to a relatively high pressure.

It has previously been proposed that the rotating shaft of the coolant circulating blower of a nuclear power plant be provided with a fluid seal comprising an essentially conventional liquid sealing means and a gas barrier means designed to prevent leakage of radioactive gaseous coolant along the shaft to the liquid seal means and leakage of liquid coolant in the opposite direction along the shaft into the gaseous reactor coolant. The gas barrier comprises a labyrinth packing disposed on the shaft between the liquid sealing means and the impeller of the blower, the inlet or suction side of the blower being connected to the packing at a point intermediate the ends thereof and the discharge or pressure side of the blower being connected to the packing at a point between the aforesaid intermediate point and the liquid sealing means. However, although this seal for rotating shafts is effective in preventing escape of radioactive gas into the surrounding atmosphere, the gas barrier means is permeated with the radioactive gas and the liquid sealant drawn out of the liquid seal means into the adjacent part of the labyrinth packing is also radioactively contaminated.

In contrast with the shaft seals of the prior art, the fluid-tight seal of the present invention is designed to prevent radioactive contamination of the liquid sealant of the liquid sealing means so that any of this liquid that may become entrained in the barrier gas may be separated therefrom and be re-used without costly purification treatment. At the same time, leakage of any trace of the liquid sealant into the main reactor coolant circuit is prevented.

SUMMARY OF THE INVENTION

The fluid tight seal for the rotating shaft of reactor coolant blowers (and similar types of apparatus) of my invention comprises, in its major components, liquid sealing means disposed about the rotating shaft, gas barriers means also disposed about the rotating shaft between the liquid sealing means and the blower of the reactor coolant circuit, and a closed barrier gas circuit through which barrier gas withdrawn from the gas barrier means is circulated and cleansed of entrained liquid sealant before being returned to the gas barrier means. The liquid sealing means is disposed in a generally annular opening formed in a stationary casing surrounding the rotating shaft, the liquid sealing means being adapted to maintain a body of liquid sealant in fluid tight contact with the surface of the shaft and the adjacent surface of the casing. The gas barrier means is also disposed in the aforesaid annular opening intermediate the liquid sealing means and the end of the shaft on which the blower impeller is mounted. The gas barrier means is mounted on the rotating shaft and defines a plurality of longitudinally spaced, annular, barrier gas spaces in which a barrier gas may be maintained. Gas inlet means are provided for introducing barrier gas into an intermediate barrier gas space of the gas barrier means, and gas outlet means are provided for withdrawing the barrier gas from the barrier gas space nearest the liquid sealing means. The closed barrier gas circuit is connected to the aforesaid barrier gas inlet and outlet means, the barrier gas circuit being provided with gas cleansing means for removing liquid sealant that may be entrained in the barrier gas. Blower means are provided for causing the barrier gas to flow through the closed barrier gas circuit and the gas barrier means associated therewith.

In the preferred embodiment of my invention, the blower means for circulating the barrier gas comprises an impeller or fan wheel mounted on the rotating shaft in the annular barrier gas space nearest the liquid sealing means. In this embodiment, circulation of the barrier gas through the closed barrier gas circuit and gas barrier means is insured when the reactor coolant blower is in operation. A separately driven auxiliary blower may also be disposed in the closed barrier gas circuit to provide for circulation of barrier gas during start up and shut down of the reactor blower as well as when the reactor blower is not in operation.

Make-up barrier gas is advantageously added to the closed barrier gas circuit to replenish the gas that is inevitably lost in the course of operation of the apparatus. The make-up gas is supplied in a predetermined measured quantity from an external source to a point in the closed barrier gas circuit downstream from the gas cleansing means of the circuit. In the preferred embodiment of the apparatus, the make-up gas is introduced into the gas barrier means at a point between the gas inlet means of the closed barrier gas circuit and the reactor coolant blower. Introduction of make-up gas at this point helps prevent contamination of the barrier gas circuit and of the liquid coolant entrained therein by radioactive gas from the coolant blower.

BRIEF DESCRIPTION OF THE DRAWING

An advantageous embodiment of the fluid-tight seal of my invention is shown schematically in the single figure of the accompanying drawing.

DETAILED DESCRIPTION

In the embodiment of my invention shown in the drawing, a rotating shaft 1 having the impeller of a blower 2 mounted on one end thereof extends through a generally circular opening formed in a stationary casing 3, the blower 2 being adapted to circulate a gaseous coolant, such as carbon dioxide, through the cooling ducts of a nuclear rector in a manner known in the art. Gas barrier means 4 are mounted on the rotating shaft in the circular opening of the casing 3 adjacent the blower 2. In the embodiment shown, the gas barrier 4 comprises a sleeve-like member on which are mounted a plurality of longitudinally spaced annular elements 8, 9, and 10 which define a plurality of longitudinally spaced generally annular barbier gas spacer 5, 6, and 7. The annular elements 8, 9, and 10, the annular barrier gas spaces 5, 6, and 7 defined thereby, and the stationary bushing 11 surrounding the gas barrier means 4 together comprise a labyrinth through which a barrier gas is circulated as hereinafter described. The stationary casing 3 and bushing 11 are provided with a gas inlet conduit 6a for introducing barrier gas into the intermediate annular gas space 6 and with a gas outlet conduit 5a for withdrawing barrier gas from the annular barrier gas space 5 of the gas barrier means 4. The casing 3 and bushing 11 are also provided with a conduit 7a for introducing make-up barrier gas into the annular barrier gas space 7 nearest the blower 2. A fan or impeller 5b is advantageously mounted on one end of the sleeve like member of the gas barrier means 4 in the annular barrier gas space 5 of the device. In the embodiment shown in the drawing, the impeller 5b and the sleeve-like member of the gas barrier means 4 are integrally formed in one piece although it is obvious that these parts could be made up of separate pieces. It is also apparent that the annular elements 8, 9, and 10 can be replaced by other types of structural elements, for example, sliding surfaces of carbon and steel, which provide the requisite plurality of annular spaces and labyrinth passageway for the barrier gas.

An oil lubricated bearing which also serves as a liquid seal is also disposed about the rotating shaft 1 within the annular opening of the casing 3. In the embodiment shown in the drawing, the bearing and liquid seal means comprises a bearing 13 disposed in a stationary bearing bushing 12, the bearing 13 being sealed against the bushing 12 means of the packing rings 14. In order to provide the desired fluid-tight seal, non-rotating friction rings 15 are disposed on both sides of the bearing 13 within the bearing shell 15a. Lubricating oil is introduced into the bearing through the oil inlet conduit 16, the oil simultaneously lubricating the bearing 13 and forming a fluid-tight seal between the rotating shaft 1 and the bushing 12 of the stationary casing 3.

The lubricating oil is introduced into the bearing and fluid seal means at a pressure that is higher than the gas pressure on the pressure side of the reactor coolant blower 2 and, as a consequence, the oil flows through the bearing and along the rotating shaft 1 in the direction of the blower. The lubricating oil is discharged from the bearing under pressure into the annular discharge duct 17 and from thence into the oil conduit 18 for re-circulation throughout lubrication circuit, oil control or seal rings 19 being provided in order to insure that substantially all of the oil from the bearing is discharged into the duct 17. In addition, annular baffles 20 and 21 are disposed in the space between the liquid sealing means and the gas barrier means to prevent any appreciable quantity of oil from entering the gas barrier means.

A closed barrier gas circuit is connected to the barrier gas outlet conduit 5a and the barrier gas inlet conduit 6a, barrier gas being caused to circulate through the closed barrier circuit and the labyrinth passageway of the gas barrier means 4 by means of the impeller 5b. The volume of barrier gas circulated through the closed barrier gas circuit is extremely small as compared with the volume of collant gas circulated by the reactor cooler blower 2, and for this reason the impeller 5b is formed with radial holes in the embodiment shown.

The barrier gas circuit is provided with cleansing means for removing entrained liquid sealant (that is, entrained lubricating oil from the liquid sealing means) from the barrier gas. The barrier gas cleansing means advantageously comprises a preliminary gravity or centrifugal separator 22 in which the larger droplets of oil or liquid sealant are separated from the gas stream by the effect of gravity. The barrier gas then is passed through a cooler 23 adapted to cool the barrier gas to a predetermined contant temperature. A further separation of entrained oil contained in the barrier gas occurs in the cooler. The barrier gas leaving the cooler 23 then passes through a further separator comprising a packed tower 24 containing, for example, a Raschig ring packing. The surfaces of the Raschig rings or other packing in the tower 24 form baffles for the mixture of barrier gas and entrained oil, and further separation of oil particles still contained in the barrier gas is thereby effected.

The barrier gas leaving the packed tower 24 is then passed through one of two parallel-connected, alternately regenerated absorption towers 28 and 29 in which the residual traces of oil or other liquid sealant in the gas are absorbed on the absorptive material contained in the absorption towers. The barrier gas cleansed of its entrained liquid sealant content is then returned through the conduit 6a to the intermediate annular barrier gas space 6 of the gas barrier means 4.

Oil or other liquid sealant separated from the barrier gas in the gravity separator 22 and the cooler 23 is delivered through conduit 25 to a liquid sump 26, and oil separated from the gas in packed tower 24 also flows into the sump 26. Oil that collects in the sump 26 is discharged therefrom by means of liquid level control valve 27 for re-use in the lubricating oil circuit of the apparatus.

In the preferred embodiment of my invention, an auxiliary blower 30 is disposed in the closed barrier gas circuit. The auxiliary blower is driven by separate power means, and operation of the auxiliary blower during starting up and shutting down periods assures circulation of the barrier gas through the gas barrier means and associated closed barrier gas circuit during these periods. Moreover, in certain embodiments of my invention, the auxiliary blower 30 circulates the barrier gas through the gas barrier means and closed barrier gas circuit during normal operation of the apparatus, thereby obviating the need for a blower 5b located in the gas barrier means 4.

A small quantity of barrier gas is inevitably lost from the barrier gas circuit; for example, by absorption by the liquid sealant or lubricating oil. To make up for the barrier gas thus lost, make-up barrier gas is advantageously introduced into the barrier gas circuit at a point downstream from the barrier gas cleansing means. In the preferred embodiment shown in the drawing, the measured quantity of make-up barrier gas from the storage tank 31 is introduced through the conduit 7a into the annular barrier gas space 7 of the gas barrier means 4. Introduction of an amount of make-up barrier gas into the space 7 in excess of that inevitably lost from the barrier gas circuit causes part of the make-up gas to flow through the labyrinth in the direction of the liquid seal means and part to flow through the labyrinth toward the reactor coolant blower 2. The flow of barrier gas toward the blower 2 prevents contamination of the gas in the barrier gas circuit and of the lubricating oil or liquid sealant entrained therein with radioactive gas from the reactor coolant circuit.

While the invention has been described hereinabove in terms of a preferred embodiment, the invention itself is not limited thereto; rather, the invention comprehends all modifications of and departures from that embodiment properly falling within the spirit and scope of the appended claims.

I claim:

1. A fluid-tight seal for a rotating shaft one end of which shaft extends into a space containing the fluid, said seal comprising:
   liquid sealing means disposed in a generally circular opening formed in a stationary casing surrounding said rotating shaft,
   gas barrier means also disposed in said circular opening intermediate said liquid sealing means and the aforesaid end of said shaft, said gas barrier means defining a plurality of longitudinally spaced annular barrier gas spaces in which a barrier gas may be maintained,
   gas inlet means for introducing said barrier gas into an intermediate barrier gas space of said gas barrier means,
   gas outlet means for withdrawing said barrier gas from the annular barrier gas space adjacent the liquid sealing means,
   a closed barrier gas circuit connected to said barrier gas inlet and outlet means, said closed barrier gas circuit being provided with gas cleansing means for removing liquid sealant that may be entrained in said barrier gas, and
   blower means for causing said barrier gas to flow through the closed barrier gas circuit and the gas barrier means associated therewith.

2. The seal according to claim 1 in which the blower means comprises an impeller mounted on the rotating shaft and disposed in the annular barrier gas space adjacent the liquid sealing means.

3. The seal according to claim 1 in which the blower means comprises an auxiliary blower disposed in the closed barrier gas circuit.

4. The seal according to claim 1 in which the gas cleansing means comprises a gravity or centrifugal separation chamber disposed in said closed barrier gas circuit wherein droplets of entrained liquid sealant are allowed to separate from the barrier gas by gravity.

5. The seal according to claim 1 in which the gas cleansing means comprises a packed tower disposed in said closed barrier gas circuit wherein entrained liquid sealant is deposited on the surfaces of the tower packing.

6. The seal according to claim 1 in which the gas cleansing means comprises an absorption tower disposed in the closed barrier gas circuit wherein entrained liquid sealant is absorbed on the absorptive material in the absorption tower.

7. The seal according to claim 1 in which the gas cleansing means comprises a gravity or centrifugal separation chamber, a packed tower and an absorption tower disposed in series in the closed barrier gas circuit.

8. The seal according to claim 1 in which cooling means are disposed in the barrier gas circuit to maintain barrier gas at a predetermined constant temperature.

9. The seal according to claim 1 in which a measured quantity of make-up barrier gas is introduced into the closed barrier gas circuit downstream from the gas cleansing means.

10. The seal according to claim 1 in which a measured quantity of make-up barrier gas is introduced into the annular barrier gas space of the gas barrier means nearest the aforesaid end of the rotating shaft.

References Cited

UNITED STATES PATENTS

| | | | |
|---|---|---|---|
| 2,820,652 | 1/1958 | Oechslin | 277—15 |
| 2,966,375 | 12/1960 | Vegezzi | 277—15 |
| 3,131,939 | 5/1964 | Cuny | 277—15 |
| 3,161,413 | 12/1964 | Audemar | 277—15 X |
| 3,235,269 | 2/1966 | Olesen | 277—15 X |

SAMMUEL ROTHBERG, Primary Examiner

U.S. Cl. X.R.

103—111